No. 658,521. Patented Sept. 25, 1900.
H. C. ATKINSON.
SAUSAGE STUFFING AND LINKING MACHINE.
(Application filed Dec. 14, 1899.)
(No Model.) 5 Sheets—Sheet 1.
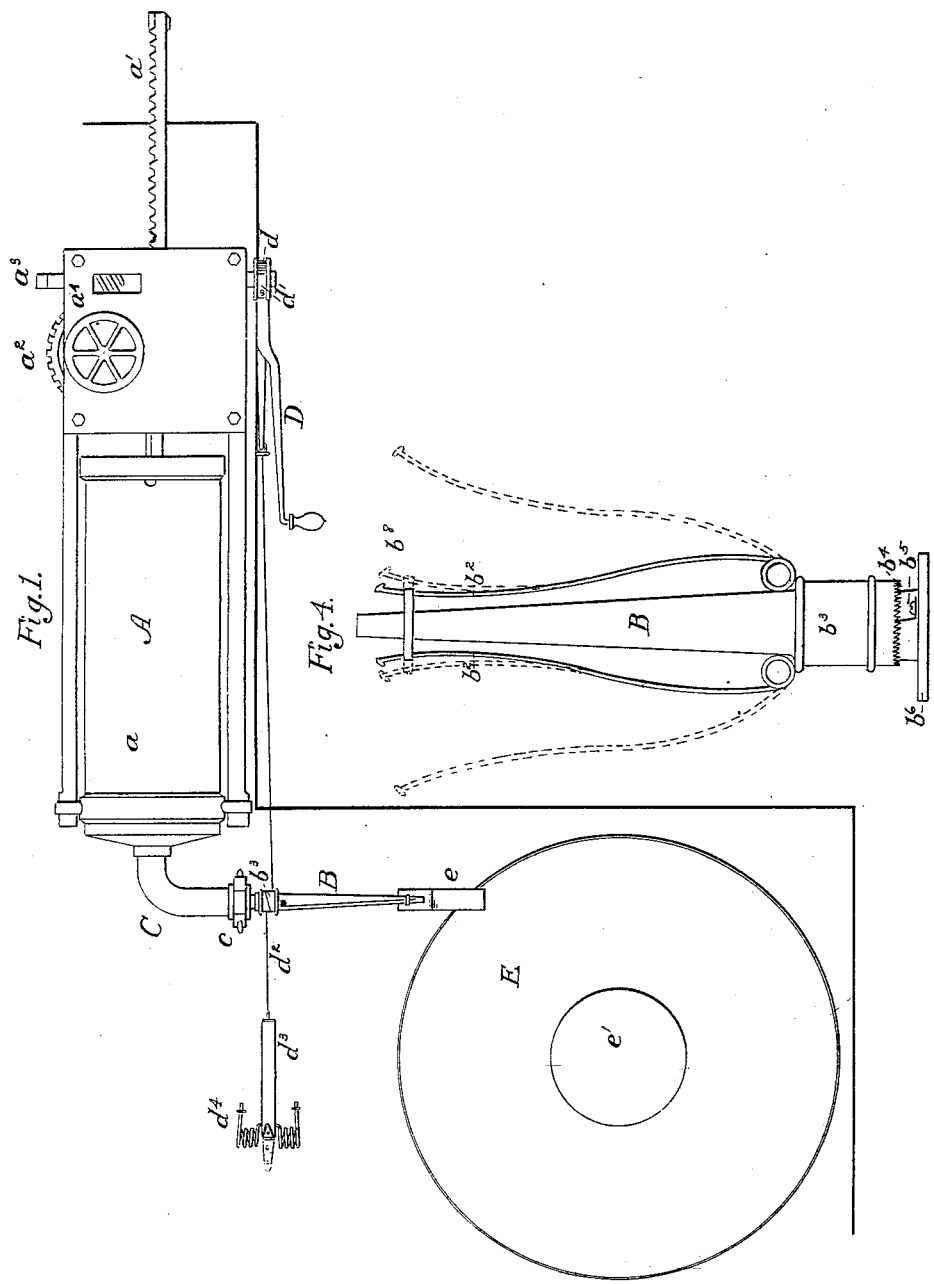
WITNESSES:
David McKelvey
S. F. McKelvey
Henry C. Atkinson   INVENTOR
BY
R. M. Kelly
ATTORNEY.

No. 658,521. Patented Sept. 25, 1900.
H. C. ATKINSON.
SAUSAGE STUFFING AND LINKING MACHINE.
(Application filed Dec. 14, 1899.)
(No Model.) 5 Sheets—Sheet 2.
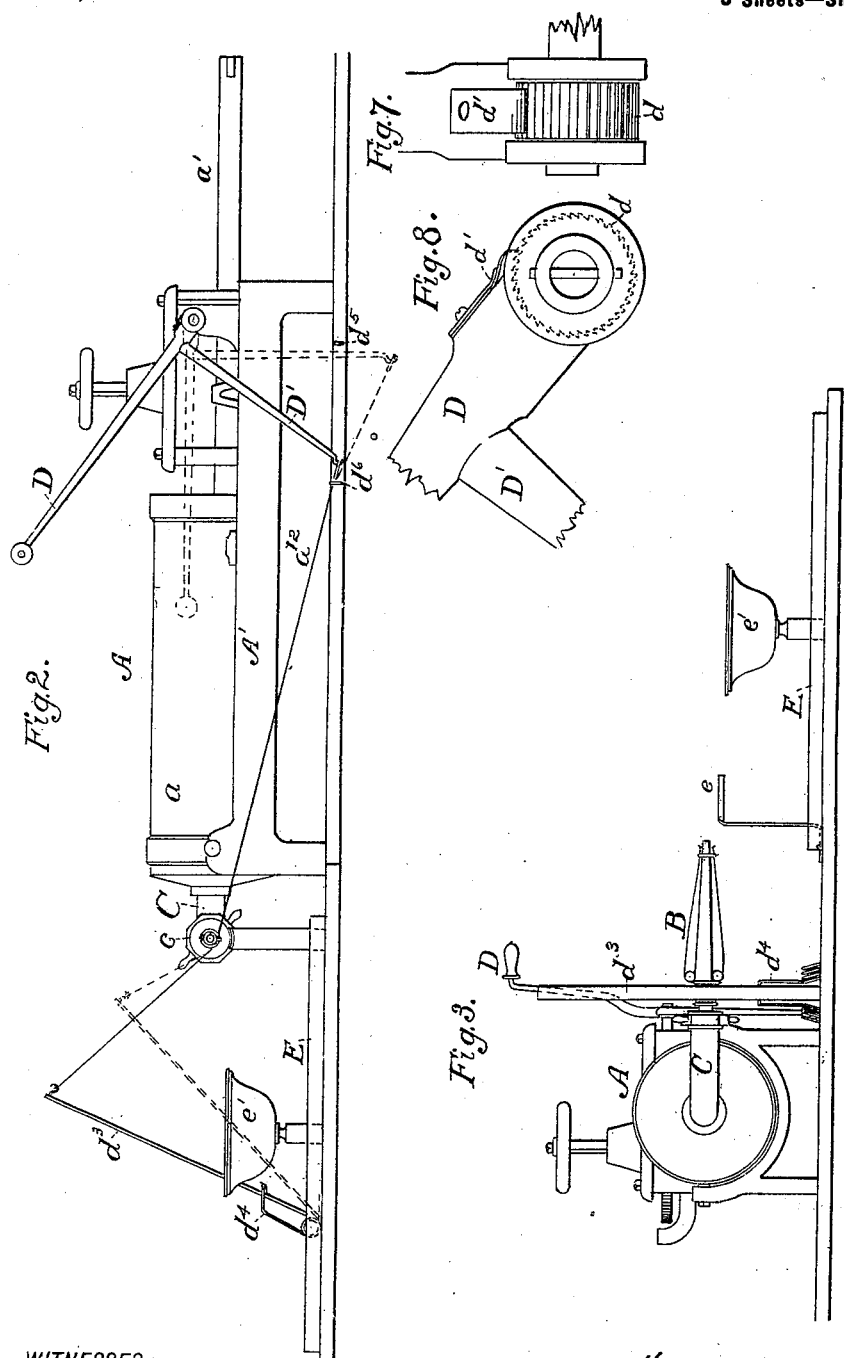
WITNESSES: David McKelvey
S. F. McKelvey
Henry C. Atkinson INVENTOR
BY
R. M. Kelly ATTORNEY.

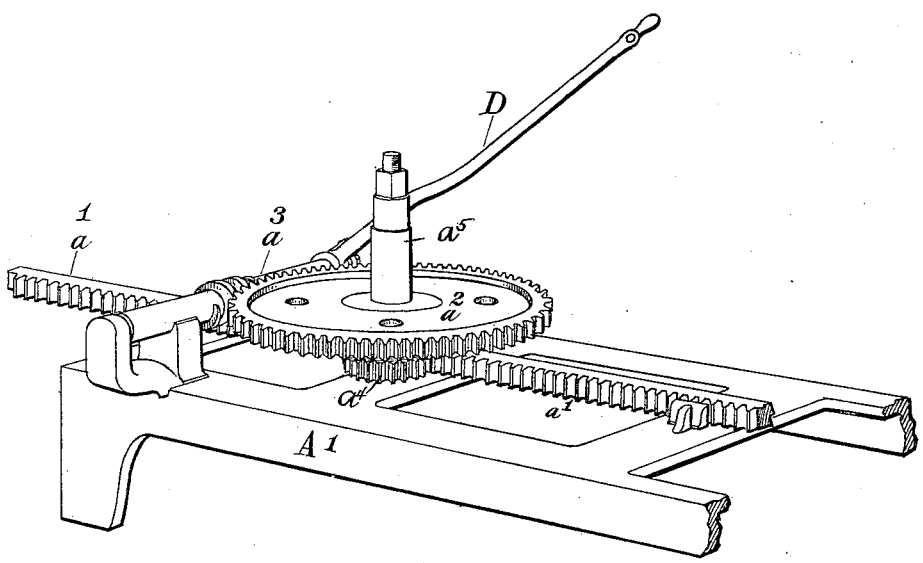

No. 658,521. Patented Sept. 25, 1900.
H. C. ATKINSON.
SAUSAGE STUFFING AND LINKING MACHINE.
(Application filed Dec. 14, 1899.)
(No Model.) 5 Sheets—Sheet 4.
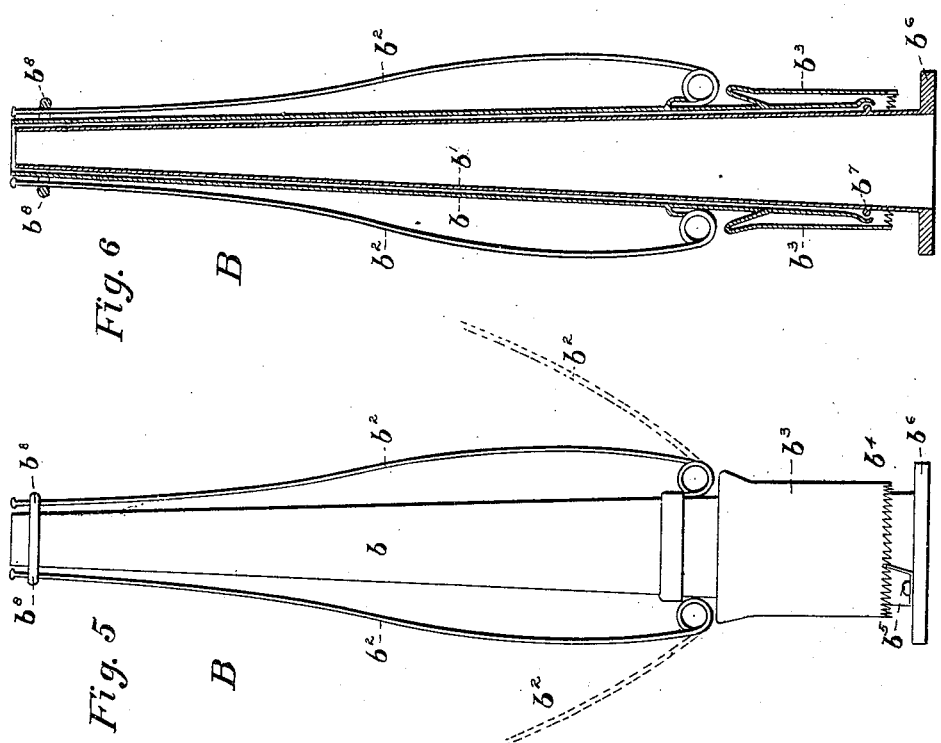

No. 658,521. Patented Sept. 25, 1900.
H. C. ATKINSON.
SAUSAGE STUFFING AND LINKING MACHINE.
(Application filed Dec. 14, 1899.)
(No Model.) 5 Sheets—Sheet 5.
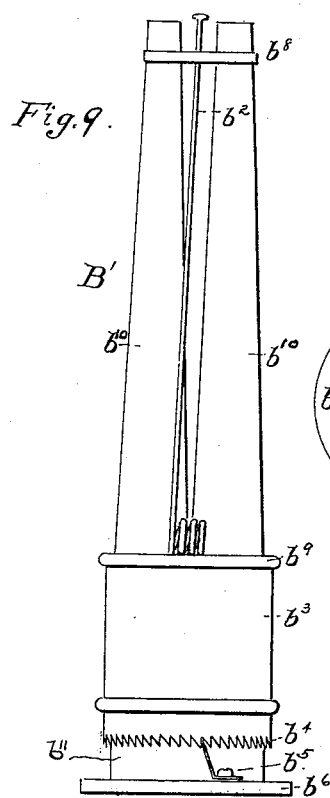
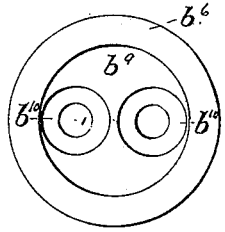
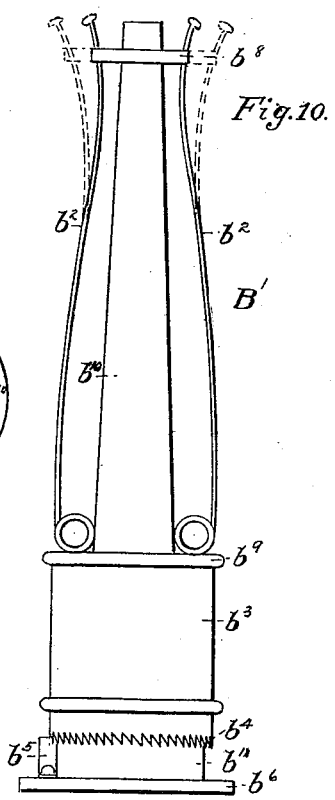
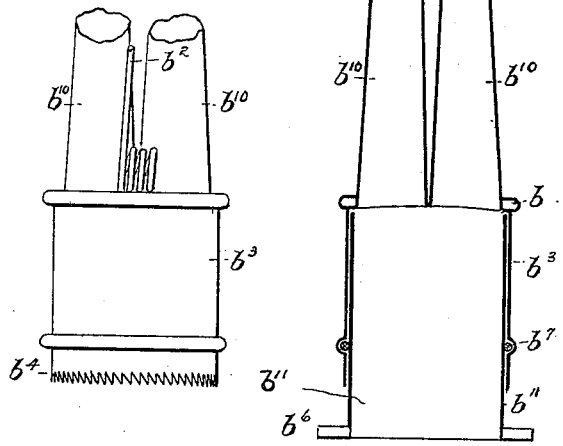
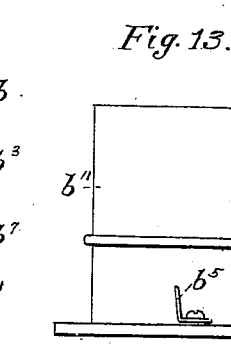
WITNESSES: David McKelvey
Henry C. Atkinson INVENTOR
BY R. M. Kelly ATTORNEY.
THE NORRIS PETERS CO., PHOTO-LITHO., WASHINGTON, D. C.

UNITED STATES PATENT OFFICE.

HENRY C. ATKINSON, OF LOUISVILLE, KENTUCKY.

SAUSAGE STUFFING AND LINKING MACHINE.

SPECIFICATION forming part of Letters Patent No. 658,521, dated September 25, 1900.

Application filed December 14, 1899. Serial No. 740,258. (No model.)

*To all whom it may concern:*

Be it known that I, HENRY C. ATKINSON, a citizen of the United States, residing at Louisville, in the county of Jefferson and State of Kentucky, have invented certain new and useful Improvements in Sausage Stuffing and Linking Machines; and I do declare the following to be a full, clear, and exact description of the invention, such as will enable others skilled in the art to which it appertains to make and use the same, reference being had to the accompanying drawings, and to the letters of reference marked thereon, which form a part of this specification.

This invention relates to linking attachments to sausage-stuffing machines, and particularly has reference to improvements in combined sausage stuffing and linking machines.

The object of the invention is to provide a means which applied to a sausage-stuffing machine will coact therewith to stuff and link the sausages in the one machine.

It is within the scope of my invention to apply my improvements to any construction of sausage-machine. I have shown a hand-power machine for the purpose of disclosing the preferred mode of applying the linking means thereto and the conjoint action of the meat-feeding means and linker; but the invention is not restricted to hand-power machines, as it embodies combinations and principles applicable to steam-power stuffing-machines, nor is it restricted to the use of the invention in conjunction with any particular construction of hand-power or steam-power machine, as it embodies novel features applicable to various constructions of sausage-stuffing machines.

While I shall hereinafter describe with some degree of particularity the detail construction of parts shown in the accompanying drawings, I do not wish thereby to be understood as being restricted to said detail construction, for the reason that I am the first to devise a linking attachment to sausage-stuffing machines which will coact with said machine in alternately stuffing and linking each sausage, and also that I am the first to devise a sausage-machine embracing both meat-feeding means and a sausage-linker, alternately actuated, whereby the length of a sausage-casing desired for a sausage may be first filled with sausage-meat and this operation immediately succeeded by the formation of a link-twist, which in turn is followed by the stuffing of the succeeding sausage, and so on until the casing-gut on the linker has been filled, and consequently of a sausage-machine not only characterized by the fact that it includes both meat-feeding and sausage-linking devices, but is further characterized by the fact that the meat-feeding means comprehends a reciprocable member having connection with the linker, so as to operate the feeder and the linker alternately.

While I have stated that the invention is not restricted to the detail embodiment thereof which will hereinafter be set forth, yet I wish it understood that said detail embodiment contains many very advantageous features for which more and less specific protection is sought in addition to generic protection.

The invention consists, first, in a linking attachment for sausage-stuffing machines, including a rotatable casing-holding part which holds the casing open to access of sausage-meat thereinto and clamping devices which hold the casing taut on said rotatable part and cause a twist to be formed in said casing when the rotatable part is rotated and yet permits the casing to be fed off the rotatable part by the pressure of inflowing meat while being stuffed; secondly, in the combination, with a sausage-stuffing machine having a rotatable casing-holding part, of means applied to said part for yieldingly holding the casing thereon and mechanism applied to said part for rotating the same at intervals; thirdly, in a sausage-machine characterized by the fact that it has in combination with meat-feeding means comprehending a reciprocable member a linking attachment and a connection between said reciprocable member and linking attachment, said parts being so related with each other that the reciprocable member controls the feeding of meat and the rotation of the linking attachment and causes the same to operate alternately, and, finally, the invention also consists in certain peculiarities in the construction of parts and in certain novel combinations of elements entering into and constituting the preferred embodiment of the invention, all substantially as hereinafter described, and definitely pointed out in the subjoined claims.

In the accompanying drawings, Figure 1 is a top plan view of a sausage-stuffing machine with my improvements applied thereto Fig. 2 is a side elevation of the same. Fig. 3 is a front end view thereof. Fig. 3ª is a detail view of the means preferred in hand-power machines for transmitting movement from the shaft $a^3$ to the piston. Fig. 4 is a side elevation of the linking attachment proper, showing in dotted lines the position assumed by the spring clamping-arms when the linking-tube is rotated and also showing in other dotted lines the position assumed by said arms when disengaged from the band. Fig. 5 is a side elevation, and Fig. 6 a longitudinal sectional view, of the linking attachment proper drawn to a larger scale. Figs. 7 and 8 are detail views looking from different directions of a pawl and ratchet for transmitting intermittent motion to the piston-gearing of a hand-operated sausage-stuffing machine from a reciprocable lever. Fig. 9 is a front elevation, and Fig. 10 a side elevation, of a modified form of linking-tube. Fig. 11 is a detail view, in elevation, of the lower part of the outer portion of the modified device. Fig. 12 is a detail view of the lower part of the modified form of linking-tube. Fig. 13 is an elevation of the inner tube of the modification; and Fig. 14 is a bottom view of the modified form of linking-tube, looking through the same.

Similar reference characters designate similar parts in the several views.

A designates a hand-power machine having a cylinder $a$, from which the meat is fed into the casing-gut by a meat-feeding means having a piston, (not shown,) moved forward intermittently by suitable mechanism, the action of which is controlled or produced by a reciprocable member, herein shown as a lever D, having a pawl $d'$ to engage a ratchet-wheel $d$ when the lever is moved backward and slide freely over said ratchet when the lever is moved forward. Said ratchet-wheel is carried by a shaft $a^3$, to which it imparts motion, and the periodical turning motion of said shaft is converted and forward step-by-step movement transmitted to the piston by any suitable gearing—such, for example, as the worm on said shaft, engaging a gear-wheel $a^2$, fixed on a shaft $a^5$, which also has a gear $a^4$ to engage the rack $a'$ at the rear end of the piston-rod, as clearly shown in Fig. 3ª. The upper end of the shaft $a^5$ is provided with a hand-wheel $a^6$ or other suitable means, by which it may be turned to restore the piston to its starting-place after it has been moved its full extent of forward travel.

Connected with the discharge-opening of the cylinder is the means B, which carries the casing-gut and through which the sausage-meat is fed into the latter and which includes a rotatable part by which the link-twists are formed. In the detail embodiment shown this means consists of a stationary tube $b'$ and a tube $b$, rotatably mounted on said stationary tube and projecting slightly beyond the outlet end thereof, with a space between them for the escape of air. These two tubes are inserted in the casing-gut. The casing holding and linking attachment is also shown as provided with a clamping device, which coöperates with the body thereof to hold the casing-gut thereon, and said body and clamping device are relatively movable toward and from each other to grasp or release or permit forward movement of the casing, so as to permit said casing to feed from the attachment during the stuffing operation and assure the formation of a link-twist at the outlet end of the attachment when the latter is actuated. The most desirable clamping means for this purpose comprises a band $b^8$ (which may be of rubber) at the mouth of tube $b$ and spring-arms $b^2$, which have free ends engaged with said band and their other ends attached to tube $b$. This form provides a very simple construction of yielding clamp which satisfactorily accomplishes the requirements of this part of the invention. Longitudinal movement of tube $b$ on tube $b'$ is prevented by suitable means, such as the ring and groove indicated at $b^7$ in Fig. 6.

An actuating means for the linker is preferably provided, and said actuating means preferably includes a cord $d^2$, which is pulled to rotate tube $b$. In the detail preferred embodiment of the invention shown in the accompanying drawings said cord extends around a spool $b^3$, formed on tube $b$, from a pivoted lever $d^3$, having a spring $d^4$. The spring and lever constitute a returning means for the cord, by which it is drawn back to its normal position when released from the pulling force. It is necessary to prevent backward rotation of tube $b$ during the return of said cord, and for this purpose the use of a ratchet $b^4$ on the rear end of tube $b$, engaged with a pawl $b^5$, projecting from a base-flange $b^6$ of tube $b'$, is preferably resorted to. Said flange also serves as a convenient means through which screws or other suitable fastening devices may be passed to secure the linker to cylinder $a$; but for convenience in handling the sausages it is preferred to attach in the discharge-opening of the cylinder an elbow-tube C, to the outer end of which said flange is fastened by a screw-nut $c$.

While an operative construction does not require a connection between the meat-feeding means and the linker, yet it is greatly preferred to actuate the linker from the actuating device of the feeding means. Therefore lever D has an arm D', which projects from it and is provided with a hook at its free end to engage an eye at the free end of cord $d^2$, and said eye is held in the path of downward movement of said arm by a screw-eye $d^6$, through which said cord passes.

In the operation of the device described lever D is rocked backward and forward several times to feed enough sausage-meat into the casing-gut to form a link of sausage. During this stuffing operation arm D' is not engaged with the cord, and in consequence the linker remains stationary. When a sufficient length of casing for a link of sausage has been filled, said lever is moved sharply downward and backward, in which movement its pawl $d'$ is disengaged from the ratchet $d$ and the hook on the end of its arm D' is engaged with the eye on cord $d^2$, thus causing the feeding of meat to cease and said cord to be pulled. A stop-lug $d^5$ is positioned to limit the downward and backward movement of said arm to that required to form the link-twist. The position of said lug will be determined by the diameter of the sausage-holding cylinder $a$. The larger the cylinder the farther back said lug will have to be placed. In the position shown in Fig. 2 tube $b$ will have been rotated 2.45 times when the arm reaches the stop. When the link-twist has been thus formed, lever D is carried to its original position, ready to repeat the stuffing operation, which is now resumed, thus stuffing the section of casing back of that which has been stuffed and linked. During the restoration of said lever to its feeding position the cord-returning means, which has thereby been relieved from pressure, operates to pull the cord to its former position, with its eye ready to be engaged with the hook when arm D' is carried downward by corresponding movement of lever D, and pawl $b^4$ and ratchet $b^5$ coöperate, as stated, to prevent backward rotation of tube $b$ by the return of said cord.

A very convenient adjunct to the machine, facilitating handling of the sausages and the materials that form the same, consists of a rotatable basin E, into which the sausages are fed from the machine and which carries a pan $e'$ for holding the supply of casing-guts, and a gutter-shaped trough $e$ at the mouth of the linker for supporting the sausages in their passage to the pan. When the sausages pile up into an inconvenient heap, the pan can be turned to carry them out of the way.

In Figs. 9 to 14, inclusive, are shown a modified form B', by which two sausages may be linked in bunches. In this form there are employed two sausage-delivery tubes $b^{10}$, fastened at their lower ends to a head $b^9$, having holes corresponding to the openings through said tubes. The stationary tube $b^{11}$ extends to the head $b^9$, and said head is secured to the spool $b^3$ and has the arms of the clamp attached to it. If desired, more than two tubes may be attached to the head, in which corresponding holes will obviously be provided.

Having thus described the invention, what I claim is—

1. The combination with a sausage-stuffing machine, having a rotatable casing-holding part, of means applied to said part for yieldingly holding the casing thereon, and mechanism applied to said part for rotating the same at intervals.

2. A sausage-stuffing machine, having meat-feeding means, comprehending a reciprocable member, a linker, and connections between said reciprocable member and linker, said parts being combined to cause the reciprocable member to operate the feeding means and linker alternately.

3. A sausage-stuffing machine, having, in combination with meat-feeding means, comprehending a reciprocable member, a linker having a rotatable part which holds the casing open to access of meat thereinto and a clamping device which yieldingly holds the casing on said rotatable part, and connections by which said reciprocable member actuates the feeder and linker alternately.

4. A sausage-stuffing machine, having in combination with meat-feeding means, comprehending a reciprocable member; a linker, having a stationary tube in communication with the discharge-opening of the machine, a tube rotatably mounted on said stationary tube and a clamping device on the rotatable tube; and connections by which the reciprocable member actuates the feeder and linker alternately.

5. In a sausage-machine, the combination with meat-feeding means, comprehending a reciprocable lever having a pawl-and-ratchet connection with the part of the feeding means actuated by it, a rotatable linker, and a connecting device actuated by a movement of the lever different from that in which it actuates the feeder, for rotating said linker, whereby the feeding means and linker are actuated by the lever alternately.

6. In a sausage-stuffing machine, the combination with a meat-containing cylinder, and meat-feeding means having a lever, of an arm projecting from said lever, a rotatable linker designed to carry the sausage-casing, and a connecting means engaged with said linker and having its ends arranged in the path traversed by said arm during one movement of the lever.

7. In a sausage-machine, the combination with a meat-containing cylinder, and meat-feeding means, of a rotatably-mounted casing holder and linker connected with the discharge-opening of said cylinder and devices for imparting forward rotation to and preventing rearward rotation of said casing holder and linker.

8. In a sausage-machine, the combination with meat-feeding means, of a rotatable linker designed to carry the sausage-casing being filled, means for preventing backward rotation of the linker, a pivoted arm actuated to rotate said linker, a flexible connecting means engaged with said arm and linker, and returning devices for the connecting means.

9. In a sausage-machine, the combination with a meat-containing cylinder, and meat-feeding means, having a lever to control the action thereof, of a rotatable linker which supports the casing being stuffed, means for preventing backward rotation of said linker, an arm projecting from said lever, a flexible connecting means engaged with said linker and with said arm, and returning devices for said connecting means.

10. A sausage-machine, having, in combination a meat-containing cylinder, meat-feeding means including an actuating-lever and devices by which said lever is connected with the feeding means proper in one direction of its movement and released therefrom in the other direction of movement, and a linker, embodying a rotatable tube which supports the sausage-casing and is provided with a clamp which permits the casing to feed therefrom when the tube is stationary and causes a link-twist to be formed when the tube is rotated, and devices for connecting the rotatable tube with said lever when the latter is disengaged from the feeding means.

11. In a sausage-machine, the combination with means for filling the sausage-casing with meat, of a rotatable linker to be engaged with said casing, a pivoted spring-upheld lever, and a cord extending around said linker from said lever and pulled to rotate said linker, and means for preventing backward rotation of the linker.

12. In a sausage-stuffing machine, the combination of a rotatable linking-tube for holding the casing being filled, means for preventing backward rotation of said tube, a pivoted spring-upheld lever, a cord extending from said lever around said tube and having an eye at its free end, and a pivotally-mounted arm having a hook which engages said eye in one direction of its movement.

13. In a sausage-machine, the combination with meat-feeding means, including a pivoted lever having means for connecting it with the feeding means proper in one direction of its movement and releasing it therefrom in the other direction of its movement, of a rotary linker which supports the sausage-casing, a spring-upheld lever, a cord secured at one end to said lever and extending around the linker, said cord having an eye at its free end, means for preventing backward rotation of the linker, and an arm projecting from the first-mentioned lever and having a hook to engage said eye in a movement of said lever other than that in which it is operatively connected with the feeding means proper.

14. In a sausage-machine, the combination with a meat-containing cylinder, meat-feeding means, and a stationary tube connected to the discharge-opening of said cylinder, of a linking-tube mounted on said stationary tube, a ratchet at one end of said linking-tube, a pawl to engage said ratchet, a cord connected with said linking-tube and pulled to rotate the same, and a returning means for the cord.

15. A sausage-machine, having, in combination with meat-feeding means, and a rotatable casing-holding tube in communication with the discharge-opening of the machine, of a clamping means on said tube constructed to permit the casing to feed from the tube, by the pressure of inflowing meat, when the tube is stationary and to grasp the casing tightly when the tube is rotated, so as to assure the formation of a link-twist by rotation of said tube, and means by which said tube is rotated at intervals.

16. A sausage-machine, having, in combination, a meat-containing cylinder, means for filling the sausage-casing with meat, a rotatable casing-holding tube, and a clamping means on said tube, embodying a flexible band at the mouth thereof and springs secured to the tube at one end and having their other ends engaged with said band.

17. A casing holding and linking tube for sausage-stuffing machines having a casing-clamp applied to its exterior and movable to and from the tube to hold, or release or permit the feeding forward of the casing, said tube being adapted to be rotatably mounted on a support.

18. A casing holding and linking attachment for sausage-stuffers, consisting essentially of a body having interior passage-way and adapted to enter and support the end of a sausage-casing and to hold the casing open to the access of sausage-meat thereinto, said body adapted to be rotatably mounted on a support, and a clamping device; the body and the clamping device being relatively movable to and from each other to grasp, or release, or permit forward movement of the casing.

19. A casing holding and linking tube for sausage-stuffing machines, having a yielding casing-clamp applied to its exterior said clamp comprising spring-arms each secured at one end to the tube, and an elastic band at the mouth of said tube engaging the unattached ends of said arms, said tube being adapted to be rotatably mounted on a support.

20. A casing holding and linking attachment for sausage-stuffers, consisting essentially of a body having interior passage-way and adapted to enter and support the end of a sausage-casing and to hold the same open to the access of sausage-meat thereinto, said body adapted to be rotatably mounted on a support, a clamping device constructed to permit the casing to feed from said body as the stuffing proceeds and to assure that a twist will be formed in the casing when the body is rotated, and suitable means for preventing rearward rotation of said body.

21. A linker for sausage-stuffing machines, having in combination, a rotatable casing-holding tube having a ratchet at one end, a pawl to engage said ratchet, a flexible ring around the mouth of said tube, and spring-arms attached to the rotatable tube at one end and having their other ends engaged with said ring.

22. A linker for attachment to sausage-stuff ing machines, embodying a rotatable casing-holding part, clamping means on said part, a cord engaging said part and pulled to rotate the same, a returning means for said cord, and means for preventing backward rotation of said part by the return of said cord.

23. A linking attachment to sausage-stuffing machines, embodying a stationary tube designed to have communication with the discharge-opening of the machine, a rotative tube thereon having a ratchet at one end, a pawl to engage said ratchet, an elastic band around the mouth of said rotatable tube, spring-arms attached to the rotatable tube at one end and having their other ends engaged with said band, a cord pulled to rotate said tube, and a cord-returning means.

24. In a sausage stuffing and linking device, the combination, with a sausage-stuffing machine, of an elbow-tube C fitting in the delivery-hole of the sausage-holding cylinder; a linker B attached to the outer end of the tube C; a cord $d^2$ passing around a spool $b^3$ on the linker B and attached at one end to a spring-lever $d^3$ and at the other to a ring held in place by an eye-screw $d^6$; a crank D, pivoted on a spindle $a^3$, provided with a pawl $d'$ and adapted to engage the teeth of a ratchet-wheel $d$ journaled on the spindle $a^3$ and having a center of motion coincident with that of D, and an arm D', having at its outer end a hook adapted to engage the ring on the end of the cord $d^2$, and rotate the outer tube of the stuffer and linker B, substantially as described and for the purposes specified.

25. A sausage stuffer and linker consisting of an inner cylindrical tube having a wire ring soldered around it near its bottom and a flange around the bottom bearing a spring-pawl erected on its upper surface, and an outer cylindrical tube, having its bottom edges toothed to form a ratchet-wheel, fitted over the inner tube and creased over the ring around it to form a spool-banker and having a head provided with two or more holes with upwardly-extending tubes fitted in them and longitudinal wire springs extending up alongside of the tubes, the outer circumference of the head forming the other banker of the spool, the outer tube with its head rotated around the inner tube, substantially as described and for the purposes specified.

In testimony whereof I affix my signature in presence of two witnesses.

HENRY C. ATKINSON.

Witnesses:
JOHN J. DAVIS,
MICHAEL REISSER.